(12) United States Patent
Jin et al.

(10) Patent No.: US 7,045,557 B2
(45) Date of Patent: May 16, 2006

(54) LIGHT-DEGRADABLE MATERIAL FOR PRODUCING DISPOSABLE MEDICAL APPLIANCES

(75) Inventors: Hua Jin, Beijing (CN); Xiangdong Zeng, Hubei (CN); Jianglin Liu, Beijing (CN)

(73) Assignee: Jin, Hua, Beijing (CN)

( * ) Notice: Subject to any disclaimer, the term of this patent is extended or adjusted under 35 U.S.C. 154(b) by 92 days.

(21) Appl. No.: 10/485,393

(22) PCT Filed: May 21, 2002

(86) PCT No.: PCT/CN02/00343

§ 371 (c)(1),
(2), (4) Date: Jan. 30, 2004

(87) PCT Pub. No.: WO03/014199

PCT Pub. Date: Feb. 20, 2003

(65) Prior Publication Data

US 2004/0152802 A1 Aug. 5, 2004

(30) Foreign Application Priority Data

Aug. 9, 2001 (CN) .............................. 01 1 28331

(51) Int. Cl.
*C08F 6/00* (2006.01)
*C08F 110/06* (2006.01)
*C08F 8/50* (2006.01)
*C08F 4/80* (2006.01)

(52) U.S. Cl. ............................................. 522/8; 29/157

(58) Field of Classification Search .................... 522/8, 522/29, 157
See application file for complete search history.

(56) References Cited

U.S. PATENT DOCUMENTS

| 3,979,482 | A | * | 9/1976 | Kagiya et al. ............... 525/193 |
| 3,981,856 | A | * | 9/1976 | Hudgin et al. ............... 523/126 |
| 4,495,311 | A | * | 1/1985 | Hudgin et al. ............... 523/126 |
| 5,135,966 | A | | 8/1992 | Chatterjee et al. |

FOREIGN PATENT DOCUMENTS

| CN | 1088227 A | 6/1994 |
| CN | 1241588 A | 1/2000 |

* cited by examiner

*Primary Examiner*—Susan Berman
(74) *Attorney, Agent, or Firm*—Birch Stewart Kolasch & Birch LLP

(57) ABSTRACT

The present invention relates to a light-degradable material for producing disposable medical appliances having main components of polypropylene resin and composite allochromatic agent, wherein the composite allochromatic agent is composed of photoinitiator and sensitizer. The photoinitiator contains ferric citrate ($FeC_6H_5O_7$) and ferrous pentadione ($FeC_5H_8O_2$), and the sensitizer contains hexachloroacetone ($Cl_6C_3O$) and acetylbenzene ($C_8H_8O$). The material of present invention is neither toxic nor polluted in producing or in using, and can rapidly change color while being irradiated by UV rays. Reuse of these medical appliances can be thereby avoided. When they are thrown away in nature, they will keep degrading and decay to powder within 45~75 days. They are desired substitutes of present material for producing disposable medical appliances.

6 Claims, No Drawings

LIGHT-DEGRADABLE MATERIAL FOR PRODUCING DISPOSABLE MEDICAL APPLIANCES

BACKGROUND OF THE INVENTION

1. Technical Field

The present invention relates to the material for producing disposable medical appliances, and especially relates to the light-degradable material for producing disposable medical appliances.

2. Background Art

With the increasing awareness of environment protection, any production of materials or action which can result in environmental pollution is limited or forbidden in many places of the world. Meanwhile, relevant regulations have been issued. The polypropylene as a light-degradable material is only used for food packing according to the Chinese patent publication No. CN1194275A. This document mainly focuses on the international problem of environmental pollution, i.e. "the white pollution". However, there is no satisfactory solution to deal with the large quantity of used and discarded disposable medical appliances, such as injectors, dropping bottles, and droppers. These materials are usually made of polypropylene. With more and more disposable medical appliances being used, large amounts of waste medical appliances are left in nature. Such medical appliances will not decompose even after a period of decades, or even longer, in nature, because the C—C bonds and C—O bonds in their structure are not sensitive to light.

Disposable medical appliances are very useful in preventing mutual virus infection. Although it is prescribed in China that all disposable injectors must be sterilized and destroyed on the spot after use, there is no suitable method available to destroy the injectors. Thus, some disposable injectors are used many times, resulting in the possibility of severe mutual infection of patients. Therefore an important worldwide agenda is to prevent the above problem from doing harm to humans and causing pollution of the environment.

At present, while light degradable material is available, it is generally used in food packing. Because the disposable medical appliances require high transparency and high biosecurity for the material used, light degradable material for food packing is not suitable for producing disposable medical appliances.

DISCLOSURE OF THE INVENTION

In order to solve above problems of harm to people caused by the reuse of disposable medical appliances, and pollution caused to the environment by the disposable medical appliances, the present invention provides the light-degradable material, obtained from polypropylene resin by adding a composite allochromatic agent therein, for producing disposable medical appliances. The allochromatic agent is composed of a photoinitiator and a sensitizer, wherein the photoinitiator contains ferric citrate ($FeC_6H_5O_7$) and ferrous pentadione ($FeC_5H_8O_2$); and the sensitizer contains hexachloroacetone ($Cl_6C_3O$) and acetylbenzene ($C_8H_8O$). The content of these components is a photoinitiator 0.04%~0.08% and a sensitizer 0.4%~0.9%, based on the weight of polypropylene resin. The photoinitiator comprises, ferric citrate ($FeC_6H_5O_7$) of 0.02% ~0.04%, ferrous pentadione ($FeC_5H_8O_2$) of 0.02%~0.04%, and the sensitizer comprises, hexachloroacetone ($Cl_6C_3O$) of 0.2%~0.45%, acetylbenzene ($C_8H_8O$) of 0.2%~0.45%, based on the weight of the polypropylene resin.

According to the present invention, the disposable medical appliances such as disposable injectors made by light-degradable material maintain high transparency, high biosecurity, and are insoluble in water. After being used, such medical appliances change color to yellow while being sterilized by UV rays in short time, because of the presence of the composite allochromatic agent. Therefore, reuse of these medical appliances can be readily avoided. Even when the medical appliances are thrown away in nature, they will keep degrading and decay to powder within 45~75 days when exposed to light. When the molecular weight a the discarded appliance decreases to about 5000, they will decompose to carbon dioxide and water by the microorganisms in the soil. Thus, the problem of pollution to the environment introduced by discarded plastic is resolved. The material of the present invention is neither toxic nor polluting, and, as such, may be a desired substitute for conventional materials when producing disposable medical appliances.

EXAMPLES

Example 1

Raise the temperature of high speed stirrer to 90° C., and put 125000 g of polypropylene, 25 g of ferric citrate ($FeC_6H_5O_7$), 25 g of ferrous pentadione ($FeC_5H_8O_2$), 250 g of hexachloroacetone ($Cl_6C_3O$) and 250 g of acetylbenzene ($C_8H_8O$) into the high speed stirrer, and then stir the mixture for 5 minutes at this constant temperature. Then put the mixture into a single-screw extruder using automatic feed equipment, and extrude out the pelletings. The heating temperatures of three parts from the feed inlet to the outlet of the single-screw extruder are 140° C., 200° C., 125° C. respectively.

Example 2

Raise the temperature of a high speed stirrer to 90° C., put 125000 g of polypropylene, 50 g of ferric citrate ($FeC_6H_5O_7$), 50 g of ferrous pentadione ($FeC_5H_8O_2$), 562.5 g of hexachloroacetone ($Cl_6C_3O$) and 562.5 g of acetylbenzene ($C_8H_8O$) into the high speed stirrer, and then stir the mixture for 5 minutes at this constant temperature. Then put the mixture into a single-screw extruder using automatic feed equipment, and extrude out the pelletings. The heating temperatures of three parts from the feed inlet to the outlet of the single-screw extruder are 140° C., 200° C., 125° C. respectively.

Example 3

This is the best mode for carrying out the invention. Raise the temperature of a high speed stirrer to 90° C., put 125000 g of polypropylene, 37.5 g of ferric citrate ($FeC_6H_5O_7$), 37.5 g of ferrous pentadione ($FeC_5H_8O_2$), 406.25 g of hexafluoroacetone ($Cl_6C_3O$) and 406.25 g of acetylbenzene ($C_8H_8O$) into the high speed stirrer, and then stir the mixture for 5 minutes at this constant temperature. Then put the mixture into a single-screw extruder using automatic feed equipment, and extrude out the pelletings. The heating temperatures of three parts from the feed inlet to the outlet of the single-screw extruder are 140° C., 200° C., 125° C. respectively.

The invention claimed is:

1. A light-degradable material for producing disposable medical appliances made of polypropylene resin having a composite allochromatic agent, the composite allochromatic agent comprising:
   a photoinitiator and a sensitizer added into the polypropylene resin,
   wherein the photoinitiator comprises ferric citrate ($FeC_6H_5O_7$) and ferrous pentadione ($FeC_5H_8O_2$), and the sensitizer comprises hexachloroacetone ($Cl_6C_3O$) and acetylbenzene ($C_8H_8O$),
   wherein the photoinitiator comprises an amount of 0.04%~0.08% by weight based on a total weight of the polypropylene resin by weight, and the sensitizer comprises 0.4%~0.9% of the polypropylene resin by weight.

2. The light-degradable material for producing disposable medical appliances according to claim 1, wherein the ferric citrate ($FeC_6H_5O_7$) in the photoinitiator comprises 0.02%~0.04% of the polypropylene resin by weight, and the ferrous pentadione ($FeC_5H_8O_2$) in the photoinitiator comprises 0.02%~0.04% of the polypropylene resin by weight.

3. The light-degradable material for producing disposable medical appliances according to claim 1, wherein the hexachloroacetone ($Cl_6C_3O$) in the sensitizer comprises 0.2%~0.45% of the polypropylene resin by weight, and the acetylbenzene ($C_8H_8O$) in the sensitizer comprises 0.2%~0.45% of the polypropylene resin by weight.

4. The light-degradable material for producing disposable medical appliances according to claim 1, the composite allochromatic agent of the polypropylene resin comprising:
   the ferric citrate ($FeC_6H_5O_7$) in an amount in a range of 0.02%~0.04% of the polypropylene resin by weight,
   the ferrous pentadione ($FeC_5H_8O_2$) in an amount in a range of 0.02%~0.04% of the polypropylene resin by weight,
   the hexachloroacetone ($Cl_6C_3O$) in an amount in a range of 0.2%~0.45% of the polypropylene resin by weight, and
   the acetylbenzene ($C_8H_8O$) in an amount in a range of 0.2%~0.45% of the polypropylene resin by weight.

5. The light-degradable material for producing disposable medical appliances according to claim 1, wherein a color of the polypropylene resin having the composite allochromatic agent becomes yellow upon exposure to UV rays.

6. A composition for producing disposable medical appliances, the composition comprising:
   a polypropylene resin; and
   an allochromatic agent, the allochromatic agent comprising:
   ferric citrate ($FeC_6H_5O_7$) in an amount in a range of 0.02%~0.04% of the polypropylene resin by weight,
   ferrous pentadione ($FeC_5H_8O_2$) in an amount in a range of 0.02%~0.04% of the polypropylene resin by weight,
   hexachloroacetone ($Cl_6C_3O$) in an amount in a range of 0.2%~0.45% of the polypropylene resin by weight, and
   acetylbenzene ($C_8H_8O$) in an amount in a range of 0.2%~0.45% of the polypropylene resin by weight.

* * * * *